United States Patent
Hyogo et al.

[11] Patent Number: 6,113,667
[45] Date of Patent: Sep. 5, 2000

[54] BRAZING ALUMINUM ALLOY POWDER COMPOSITION AND BRAZING METHOD USING SUCH POWDER COMPOSITION

[75] Inventors: Yasunori Hyogo, Susono; Hiroto Momosaki; Ken Tohma, both of Mishima, all of Japan

[73] Assignee: Mitsubishi Aluminum Kabushiki Kaisha, Tokyo, Japan

[21] Appl. No.: 08/989,228

[22] Filed: Dec. 11, 1997

[30] Foreign Application Priority Data

Dec. 14, 1996 [JP] Japan ................................. 8-352699
Mar. 27, 1997 [JP] Japan ................................. 9-75358
Oct. 14, 1997 [JP] Japan ................................. 9-296322

[51] Int. Cl.⁷ .......................... C22C 21/02; C22C 21/10

[52] U.S. Cl. ........................ 75/255; 75/252; 420/540; 420/548; 420/578; 148/437

[58] Field of Search ................. 75/252, 255; 148/437; 420/540, 548, 578

[56] References Cited

U.S. PATENT DOCUMENTS

| | | |
|---|---|---|
| 3,971,501 | 7/1976 | Cooke ................................. 228/248 |
| 5,100,048 | 3/1992 | Timsit ................................. 148/24 |
| 5,251,374 | 10/1993 | Halstead et al. ............... 29/890.047 |
| 5,547,517 | 8/1996 | Iwai ..................................... 148/24 |
| 5,820,698 | 10/1998 | Tohma et al. ..................... 420/540 |

FOREIGN PATENT DOCUMENTS

| | | |
|---|---|---|
| 0 140 267 | 5/1985 | European Pat. Off. . |
| 7-88689 | 4/1995 | Japan . |
| 7-314177 | 12/1995 | Japan . |
| 8-511201 | 11/1996 | Japan . |
| WO 94/29072 | 12/1994 | WIPO . |

Primary Examiner—George Wyszomierski
Attorney, Agent, or Firm—Eugene Lieberstein; Michael N. Meller

[57] ABSTRACT

A brazing powder comprises a single powder or mixture powder that is composed of one or more type of elements consisting of Al, Si and Zn, having the composition of Al—Si—Zn hypereutectic alloy in terms of the total amount. The brazing powder comprises above 15% but up to 60% by weight of Si and 5% to 30% by weight of Zn.

6 Claims, 6 Drawing Sheets

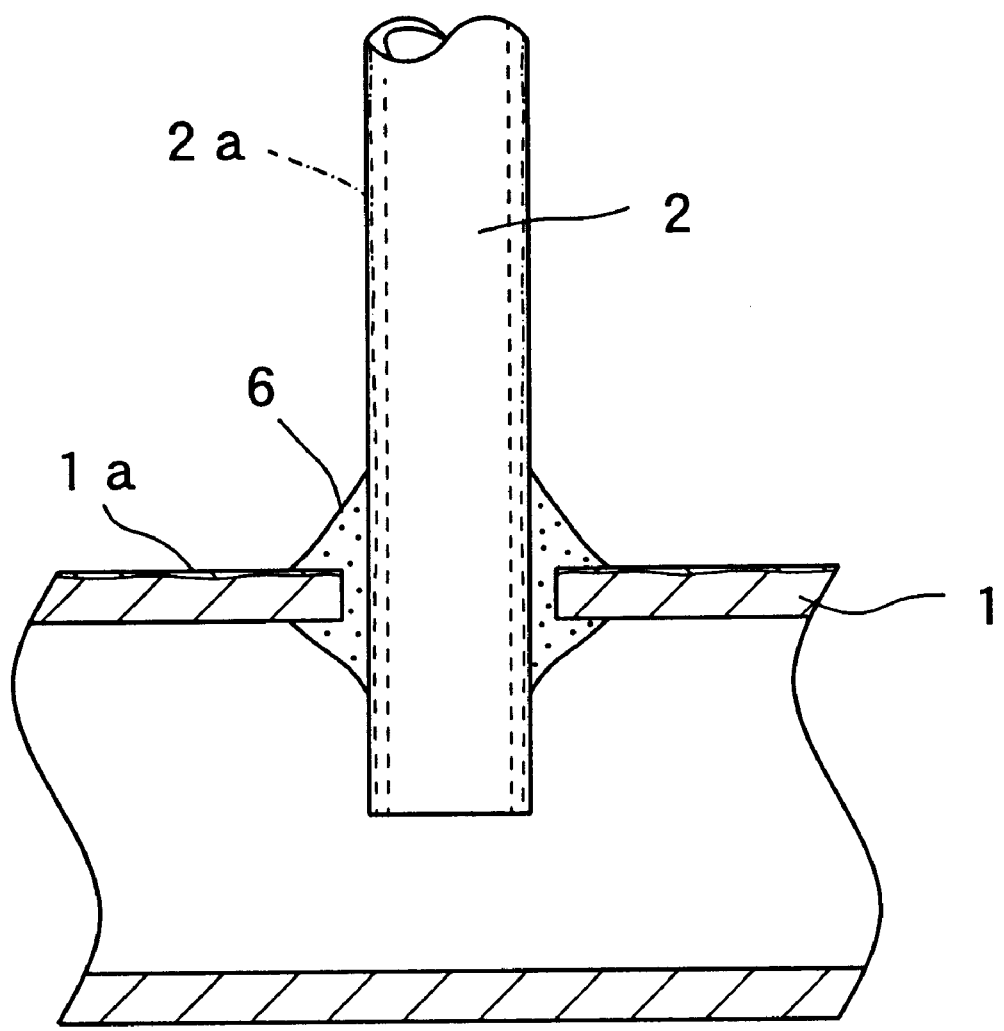
F I G. 3

BRAZING ALUMINUM ALLOY POWDER COMPOSITION AND BRAZING METHOD USING SUCH POWDER COMPOSITION

BACKGROUND OF THE INVENTION

The present invention relates to a brazing powder composition for use in joining objects, such as mechanical parts, elements, members and the like of aluminum or aluminum alloy, and a method of joining such parts, etc. using such brazing powder composition. One of its possible applications is a manufacture of a heat exchanger assembly.

As means to join two or more objects of aluminum or aluminum alloy by brazing, a brazing material is provided in a powdery form, and is applied to the joint surfaces of the objects being joined. A typical example is disclosed in U.S. Pat. No. 3,971,501 which describes that the brazing powder may be used with no or little limitations to the shape, form or the like of the point of the joint, and may be easily applied even in those areas where some objects, such as complicately configured items, are difficult to be arranged for which any of the prior art brazing materials could be used. In this respect, the above U.S. patent has wide attention.

The brazing powder disclosed in the above patent uses Al—Si eutectic alloy having a melting point below that of aluminum or aluminum alloy parts being joined by brazing. In order to improve a corrosion resistance of the joint, another U.S. Pat. No. 5,547,517 discloses a brazing powder that includes Al—Si eutectic alloy and a small amount of Zn added thereto. A further U.S. Pat. No. 5,251,374 discloses a brazing powder that includes a mixture of Al—Si alloy powder and Zn powder. In U.S. Pat. No. 5,547,517, the brazing powder comprises at most 5% by weight of Zn to be added, while in U.S. Pat. No. 5,251,374, the brazing powder includes at most 3% by weight of Zn to be mixed. An exception to the two patents is Japanese patent application, as now open to a public inspection under Heisei 7-314177, which proposes a brazing powder that is composed of Al—Si—Zn alloy containing 10 to 50% by weight of Zn. Another Japanese application, also now open to a public inspection under Heisei 7-88689, discloses a brazing composition containing not more than 20 parts by weight of Zn.

It is noted that the component of Zn in the brazing composition has a melting point lower than that of Al—Si alloy components, and thus may melt earlier during a brazing process. Accordingly, Zn may tend to move from a coating area toward an area where a fillet is to be formed, and at where Zn may be concentrated. In the portion of the coating area to which Zn has moved, therefore, the satisfactory corrosion resistance cannot be provided by Zn because of its lower content. Alternatively, it may be possible to provide a brazing powder composition that containing more Zn. In this case, however, Zn may have an increased concentration that is more than as required, in the area where the filet is to be formed. When this happens, Zn acts predominantly, which may cause Zn to erode the fillet and others. Thus, it affects the corrosion resistance disadvantageously.

The brazing powder composition that contains Zn as described provides no satisfactory corrosion resistance. For example, in heat exchangers, such as that mounted on auto-vehicles, that must meet the requirements for high corrosion resistance, Zn is previously sprayed thermally, forming a Zn coat onto the surface of the aluminum parts being joined by brazing. Particularly, European patent application, as now open to the public inspection under No.0140267, discloses a process that includes forming a Zn-deposited layer. It is noted, however, that this process involves more steps, increasing the manufacturing cost.

For the joint that includes a large gap between two parts being joined by brazing, such as the joint between tubes and headers in the heat exchanger assembly, or for the joint that requires a large fillet to be formed, the amount of brazing powder used for brazing increases considerably, thus increasing the amount of brazing powder to be coated accordingly. With the increased coating, several coatings are required, as the amount of coating that can be achieved by a single coating (such as by flow coating) is limited. This increases the coating steps, resulting in the higher manufacturing costs. In general, the brazing powder is expensive so that the material cost increases with the increasing usage of the brazing powder.

The inventors of the current application studied the problems associated with the prior art brazing powder, and have discovered that when the brazing powder that includes the hypereutectic Al—Si alloy is used, a base metal is eroded (melted) during the brazing process, and part of the base metal that has been eroded provides the brazing action together with the coating of the brazing powder that has been applied. Then, the inventors have found that the use of brazing powder and therefore the number of its coatings can be reduced while maintaining the good brazeability. It is noted that PCT international publication of No. WO 94/29072 and Japanese patent publication of No. Heisei 8-511201, both of which are open to the public inspection, disclose a brazing material composition that contains more Si, but does not describe that the hypereutectic alloy provides the similar results as described above.

It is also noted that when the Al—Si hypereutectic alloy is used as a brazing material, Si becomes crystallized and crystallized Si causes local corrosion due to the cathode or other corrosion that may form pits. That corrosion may reduce the corrosion resistance in the brazed joints or the areas on which the coating of the brazing powder has been applied. To avoid this problem, more steps must be done so that Zn coating is formed as described.

Because of those problems, the conventional brazing powder is less economical.

OBJECT OF THE INVENTION

In light of the above problems and to solve those problems, one object of the present invention is to provide a novel brazing powder and an improved brazing method wherein the corrosion resistance of the brazed joint may be increased without requiring any complex, extra steps.

Another object of the present invention is to provide a novel brazing powder and an improved method wherein the above object may be attained without having to increase the amount of brazing powder to be used, and the brazing process can occur with the reduced amount of brazing powder.

SUMMARY OF THE INVENTION

The present invention includes a brazing aluminum alloy powder composition.

Specifically, in a first embodiment of the aluminum alloy brazing powder composition, it is comprised by one or more powder materials, which is essentially consisting of one or more elements selected from the group consisting Al, Si, and Zn, and the total amount of said one or more powder materials have a hypereutectic alloy composition consisting of Al—Si—Zn.

In a second embodiment of the brazing aluminum alloy powder composition, it comprises one or more powder materials in which the total powder materials is essentially consisting of above 15 but up to 60% by weight of Si and 5 to 30% by weight of Zn.

In a third embodiment of the brazing aluminum alloy powder composition, it comprises one or more powder materials selected from a group consisting of Al—Si alloy, Al—Si—Zn alloy, Al—Zn alloy, Si or Si alloy, and Zn or Zn alloy, all in a powdery form.

In a fourth embodiment of the brazing aluminum alloy powder composition, it comprises one or more powder materials consisting of a mixture of Al—Si—Zn ternary hypereutectic alloy and Si in a powdery form.

In a fifth embodiment of the brazing aluminum alloy powder composition, it comprises one or more powder materials, it consists of a mixture of Al—Si—Zn ternary hypereutectic alloy and Si in a powdery form, said Al—Si—Zn ternary hypereutectic alloy having the composition of 13 to 45% by weight of Si, 6% to 35% by weight of Zn, and the balance consisting Al and inevitable impurities.

In a sixth embodiment of the brazing aluminum alloy powder composition, it comprises one or more powder materials, it consists of a mixture of Al—Si—Zn ternary hypereutectic alloy and Si in a powdery form, in which the Al—Si—Zn ternary hypereutectic alloy powder has the average grain size of between 5 and 100 µm and Si powder has the average grain size of between 1 and 50 µm, the average grain size for the former being relatively large as compared with that for the latter.

In a seventh embodiment of the brazing aluminum alloy powder composition, it comprises one or more powder materials, further comprises brazing flux added.

The present invention also includes a method of brazing that may be performed by using any of the brazing aluminum alloy powder compositions according to the above embodiments.

Specifically, in an embodiment of the method, it may be performed to braze an aluminum or aluminum alloy part, element, member or the like as an object being brazed (referred to as "aluminum object"), comprising the steps of applying a coating of any of the above brazing powder upon the surface of the aluminum object, allowing the applied coating as well as part of the surface of the aluminum object carrying the coating to be melted, and allowing the melted materials to set, thereby brazing the aluminum object and forming a Zn-contained layer onto the surface of the aluminum object.

In a second embodiment of the method, it further comprises the step of adding a brazing flux, binder resin and solvent to the brazing aluminum alloy powder prior to applying its coating and mixing them into a slurry form.

In a third embodiment of the method, it further includes the step of performing a Zn-coating layer onto the surface of the aluminum object prior to its brazing.

DESCRIPTION OF THE INVENTION

The inventors of the current application have discovered that the corrosion resistance may be improved remarkably by adding Zn to the hypereutectic Al—Si alloy, without having to increase the amount of brazing powder to be used, as opposed to the conventional brazing powder that includes Zn, which has no positive effect on improving the corrosion resistance. Then, the present invention is based on that discovery.

It should be understood that the brazing powder must contain a prescribed amount of Si as part of its total amount so that it can become hypereutectic. As the eutectic point of Si has effect upon the content of the other components, it cannot be specified uniquely. For instance, the brazing powder may become hypereutectic by specifying Si as above 15% by weight. As this hypereutectic brazing powder contains excessive Si, Si may tend to diffuse into the aluminum object during the brazing process, lowering the melting point of the object and thus causing part of the object to be melted (eroded). The portion of the object that has been melted may flow together with the applied coating of the brazing powder, filling any gap in the joint or forming a fillet. That portion of the object may form part of the applied brazing materials, and together provide the amount of the brazing powder as required for brazing. Thus, the total amount of the brazing powder used for coating can be reduced. It is noted, however, that if the brazing powder contains less Si which makes the brazing powder eutectic or hypoeutectic, the melting action for the object cannot be provided.

To provide the above melting action, the amount of Si is preferably 20% or more. More preferably, it is 25% or more.

If the brazing powder contains an excessive amount of Si, Si may more easily erode the object deeply into its depth, removing some portions from the object and thereby making those portions extremely thinner. This makes the joint less strong. In addition, perforation may be produced by corrosion. This introduces problems in respect to the strength and corrosion resistance. Particularly, as the brazing powder contains Zn, Zn is introduced predominantly into the eroded area of the object if erosion is caused by Si, promoting the eroding action further. If the brazing powder containing 60% or more of Si, the melting point of the brazing powder may reach above 1150° C., And it is difficult to produce the brazing powder. For this reason, the amount of Si is preferably 60% or below, it is more preferably 50% or below, and it is most preferably 45% or below.

It is noted that as the hypereutectic powder acts so as to dissolve the portion of the base metal carrying the applied coating of the brazing powder, Zn, which is contained in the brazing powder, diffuses more easily into the dissolved portion of the base metal. This increases the concentration of Zn in the dissolved base metal portion, resulting in the formation of a Zn-contained layer on the surface of the brazing powder-coated portion that contains a highly concentrated Zn having a small concentration difference. It is also noted that Zn diffuses from the Zn-contained layer deeply into the base metal. The result is that the brazing powder-coated portion may include a Zn-contained layer as well as a Zn-diffused layer. The Zn-diffused layer may extend into the depth where Zn is rich enough to protect against any corrosion. This eliminates the problem of the conventional brazing powder wherein initially the best corrosion resistance was obtained, but was gradually decreasing over time.

It is also noted that a molten solder that flows in such a way to form a fillet is also always eroding new portions of the base metal while it is flowing. Thus, Zn in the molten solder is diluted with the accompanying reduction. Therefore, the flowing molten solder would contain Zn of low concentration, and Zn in the fillet would have a concentration that is low relative to that of the brazing powder coated portion. According to the prior art, a concentration of Zn in the fillet would become higher, making the fillet more susceptible to the corrosion. Eventually the fins might be removed. According to the present invention, that situation is avoided. As Zn in the fillet has the concentration that is low relative to that of the brazing powder coated portion, it would also act as a sacrifice anode which improves the corrosion resistance for the fillet.

For the brazing powder-coated portion that contains a sufficient quantity of Zn, the type of corrosion that occurs is the general corrosion which prevents the corrosion from progressing into the depth. Thus, the improved corrosion resistance may be provided.

As the brazing hypereutectic alloy powder acts upon the object being brazed so that part of the object can become molten solder, the amount of the molten solder will become more than the amount of the applied powder coating. If Zn content is less, and when it is diluted, the adequate corrosion resistance might not be provided. For this reason, the total Zn content should preferably be more than 5%.

For the same reason, the Zn content should preferably be 8% or more. More preferably, it should be 10% or more, and most preferably, it should be 15% or more.

If the Zn content is excessive, the object applied powder coating would become eroded at a higher rate, reducing the corrosion resistance. Thus, it is preferred that the total Zn content be 30% or below by weight. More preferably, it should be 25% or below by weight.

The inventors of the current application have found that a powdery mixture composed of two or more different elements and/or alloys may provide the results equivalent to those provided by using the single hypereutectic Al—Si—Zn alloy as described so far. In terms of the total amount, this powdery mixture may be equal to the hypereutectic Al—Si—Zn alloy, and the values for the Si and Zn contents as specified above may be used. The powdery mixture may be comprising two or more materials selected from the group consisting of Al—Si alloy, Al—Si—Zn alloy, Al—Zn alloy, Si or Si alloy, and Zn or Zn alloy in powdery forms. It should be noted that when any particular metal or alloys are selected from the above group, the composition of the metal or alloy and a mixture ratio for each different that are not limitative, but that may be varied. The important are that it should be equal to the hypereutectic Al—Si—Zn alloy that includes any desired components, in terms of the total amount. To ensure that the applied brazing powder coating provides the dissolving action and the powder is dissolved more uniformly. It is desirable that the Al—Si alloy or Al—Si—Zn alloy in the above group should become hypereutectic. For this reason, it is desirable that at least either of those alloys should be included when selection is made from the group.

It is noted that when the Al—Si alloy or Al—Si—Zn alloy is made hypereutectic, Si content in either of those alloys may be equal to the Si content as specified above for the Al—Si—Zn alloy.

For the lower limit of the Zn content, however, it may be equal to the Zn content as specified for the hypereutectic Al—Si—Zn alloy; for the upper limit, it should preferably be 30%, and more preferably 20%, because more Zn content make Zn oxidized considerably when it is dissolved, changing into zinc oxide, and no more solid solution can occur in the brazing material. This makes the production difficult. More Zn can be included by including the required amount or supplemental amount of powdery Zn.

The brazing component of the invention containing the alloys and/or components as specified above may be formed into a powder by using any usual method, such as mechanical powdering, atomizing, centrifugal spraying and etc. In this case, the grain size may be adjusted, such as between 1 and 100 $\mu$m. It is noted that if the grain size is too large, a powder coating layer might be formed with a nonuniform thickness. This would cause a great difference in the product dimensions which may lead to poor brazing.

In adjusting the grain size, if the mixture powder contains Si, it is desirable that the grain size for Si powder is smaller than that for the other element powders. This is because Si powder erodes the object being brazed more aggressively, and when the grain size for the Si powder is smaller, Si may diffuse evenly in the mixture powder, which may reduce local erosion of the brazed object by Si powder. In this way, the erosion by Si can occur evenly and mildly.

Specifically, therefore, when the mixture powder including Si powder and other element powders, it is preferable that the average grain size for the other element powders should range between 5 and 100 $\mu$m, while the average grain size for Si powder should range between 1 and 50 $\mu$m. and should be relatively small as compared with that for the other powders.

It is more preferable that the average grain size for the other element powders should range between 10 and 70 $\mu$m, and the average grain size for Si powder should range between 1 and 30 $\mu$m, the average grain size for Si powder preferably being smaller than that for the other powders. Most preferably, the average grain size of the other element powders should range between 15 and 40 $\mu$m, and the average grain size for Si powder being smaller than that for the other powders.

Those average grain sizes as specified above may be applied to the mixture powder composed of Al—Si—Zn ternary hypereutectic alloy powder and Si powder.

A brazing powder may be provided by adding any suitable brazing flux to any single powder or mixture powder, as desired. Any suitable mixture ratio may be chosen. For instance, 1 to 2 parts by weight of the blazing flux may be added to 20 to one parts of a single or mixed aluminum alloy powder. It should be understood that the present invention is not limited to the mixture ratio as specified above.

The brazing flux that may be used includes fluorides such as $KAlF_4$, $K_2AlF_5.5H_2O$, $K_3AlF_6$, $AlF_3$, and chlorides such as NaCl, KCl, LiCl, $ZnCl_2$. The present invention is not limited to those types of flux, however.

When a coating of any of the brazing powder described above is applied onto the object being brazed, it should comprise any suitable type of solvent or/and binder that may facilitate the bonding. Solvent that may be used includes water, alcohols (preferably, carbon 1 to 8 aliphatic alcohols) or the like.

Binder that may be used includes any binder that can bond a powder well without affecting the quality of the brazed joint, such as carboxyl group water-soluble polymer compounds, acrylic resins, methacrylic resins, or the like. The mixture ratio of those solvent and binder may be chosen as desired.

A coating of the brazing powder thus obtained and which includes any solvent and binder may be applied onto an object being brazed. The coating may be applied by using the spray method, shower method, flow coat method, roll coater method, brushing method, immersion method, or the like. It is noted that the present invention is not limited to those methods.

Objects being joined by the brazing powder of the invention may comprise at least one that is made of aluminum or aluminum alloy. It is noted that aluminum alloy is not limited to its particular composition. It is also noted that aluminum or aluminum alloy may have any production history. A Zn-coated layer may be performed on the surface of the aluminum object. This Zn coating layer may be performed by any suitable method, such as metal spraying or coating and immersion plating.

BRIEF DESCRIPTION OF THE DRAWINGS

FIG. 3 is a similar view of FIG. 1, and shows, on an enlarged scale, part of the heat exchanger assembly in which the tube is now joined to the header after the two parts have been brazed.

DESCRIPTION OF THE PREFERRED EMBODIMENTS

Figure 1:
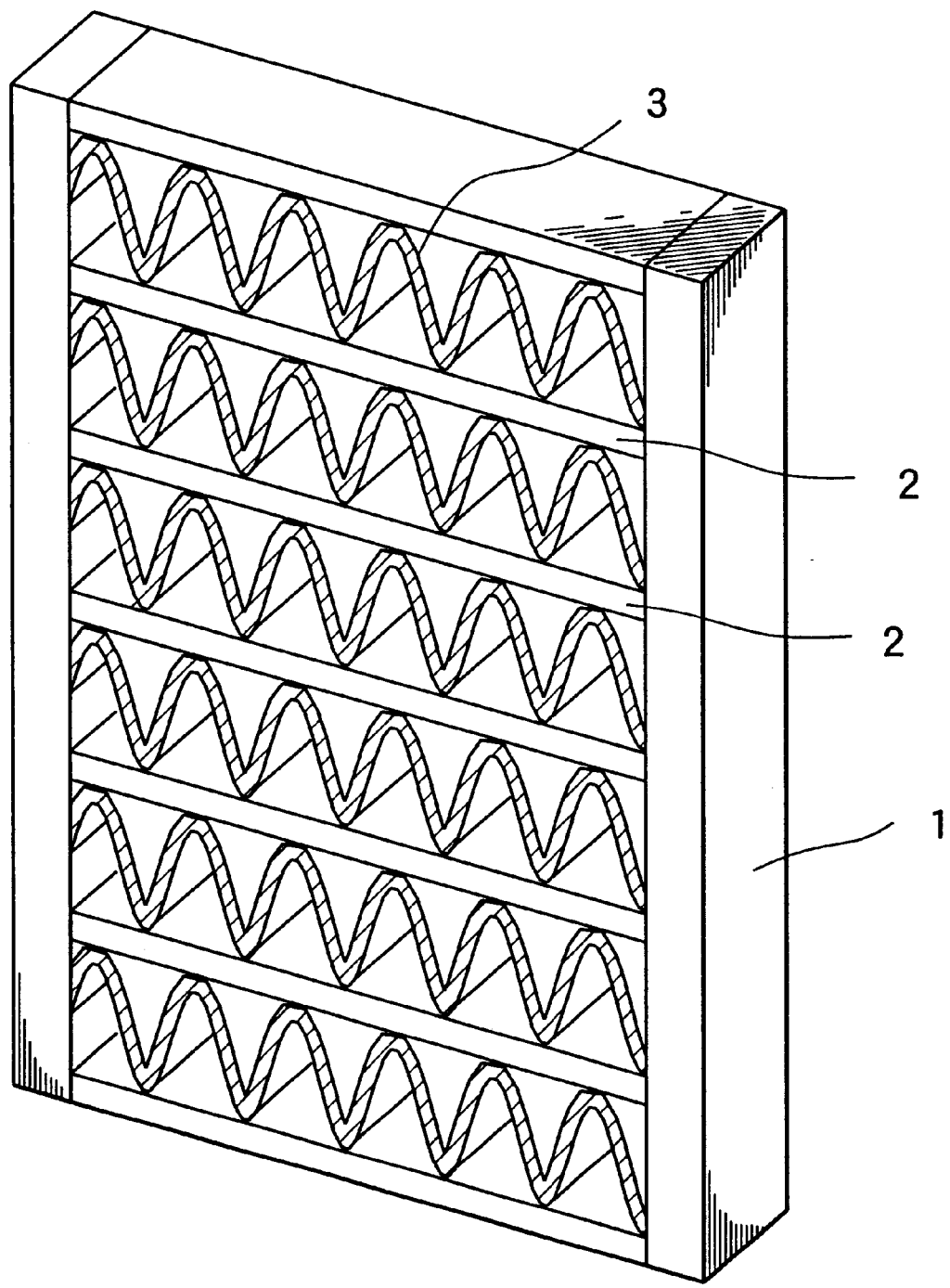
FIG. 1 is a perspective view of a heat exchanger assembly to which the present invention may be applied.

FIG. 1 shows a heat exchanger assembly to the brazing powder composition and method according to the present invention may be applied. In the following description, some of its possible applications are presented. It should be understood that the following applications are only presented by way of example, and the present invention is not restricted to those applications.

The heat exchanger assembly includes headers 1, 1, tubes 2 . . . 2, and radiator fins 3 . . . 3 formed like a wave, all of which are made of JIS A3003 aluminum alloy. The heat exchanger assembly may be completed by assembling those individual elements. When the individual elements are assembled, each of the joints between the corresponding respective elements may be provided by using a brazing powder composition and a method according to the present invention, which will be described below in more details.

Figure 2:
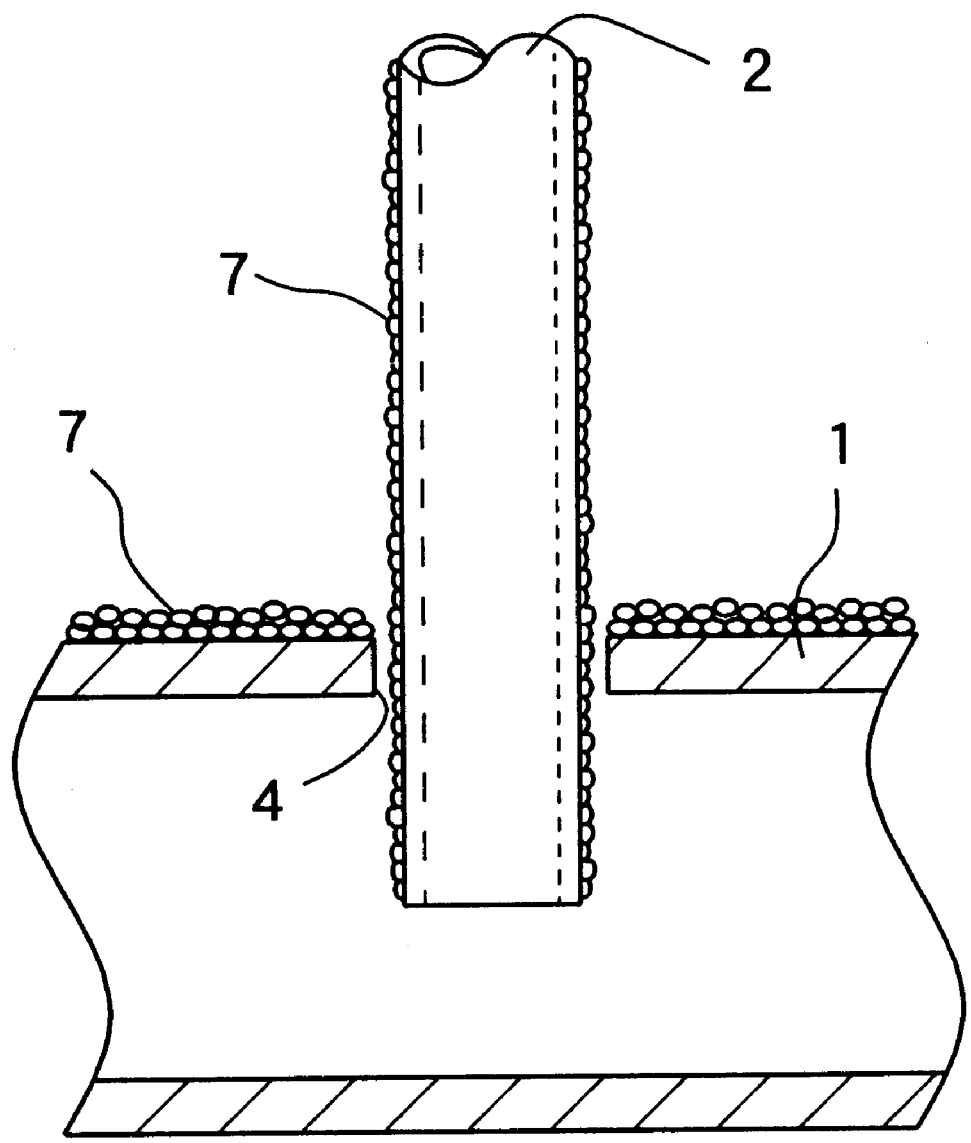
FIG. 2 is a similar view of FIG. 1, and shows, on an enlarged scale, part of the heat exchanger assembly in which a tube is inserted into a header prior to being brazed.

A brazing powder composition is prepared so that Al—Si—Zn hypereutectic alloy may be obtained, which is then atomized to a specific grain size by using an atomizing process. In FIG. 2, a tube 2 having an applied coating of the brazing powder 7 on its surface is shown to be inserted into a hole 4 in a header 1 also having an applied coating of the brazing powder 7 on its surface.

The assembly, which includes all joints processed as above, is then heated at an adequate temperature in a suitable ambient atmosphere, allowing the brazing powder 7 on those joints to be melted. The applied heating is preferably in the range of between 580° C. and 620° C. At 580° C. or below, the powder 7 as well as part of an object itself being brazed, such as headers, etc. (referred collectively to as the "object"), would not melt completely, and the joints would not be finished. At above 620° C., erosion would occur to a considerable degree. In this respect, the above temperature range is desirable. Preferably, the assembly is kept heated at this temperature range, for a period of one to 10 minutes.

FIG. 3 shows that the header 1 and tube 2 are now joined by using the brazing powder 7 of the present invention. As seen from FIG. 3, the joint includes a sufficient amount of fillet 6 thus formed. On each of the respective surfaces of the header 1 and tube 2 having the applied coating of the brazing powder 7, a setting layer 1a, 2a is formed, respectively, which contains the applied powder 7 that was once melted and is now set.

Some part of Zn, which is contained in the applied powder 7, may go into the above joints, and the remainder may exist in the setting layers 1a, 2a formed from the applied powder 7, with adequately and evenly distributed concentration. This may facilitate the general corrosion on the respective surfaces of the setting layers, producing Si crystallization that protects against any local corrosion or other corrosion that may form pits. The result is the improved corrosion resistance. It should be noted that part of Zn contained in the respective joints has the concentration lower than that of the part of Zn in the applied coating. So, no partial setting of Zn is noticed.

It is to be understood that when the powder of the invention is applied, the base metal may be partly melted into solder, reducing the thickness of the base metal after the brazing is completed. As such, the present invention is particularly suited to those sheet metals having a specific thickness, such as 0.5 mm or more thick, for example. It is to be appreciated, however, that the present invention is not restricted to those sheet metals as specified above. Also, the present invention is not limited to the application described above, but may be used in other applications.

The following tests were performed to evaluate the effectiveness of different embodiments of the present invention, which will be described below.

EXAMPLE 1

As shown in Table 1, several samples of the aluminum alloy powders, each of which contains different quantities of Si and Zn (which have maximum grain size of 75 µm and average grain size of between 20 and 30 µm, respectively), were provided in accordance with the present invention. In addition, a brazing flux composed of the class of fluorides and a binder composed of the class of acrylic resin were provided. Then, The brazing powders were obtained by mixing them in the proportion of 10:1:1 by weight. To compare with these inventive samples, different non inventive samples were provided, which contain Al—Si alloy or Al—Si—Zn alloy.

Figure 4:
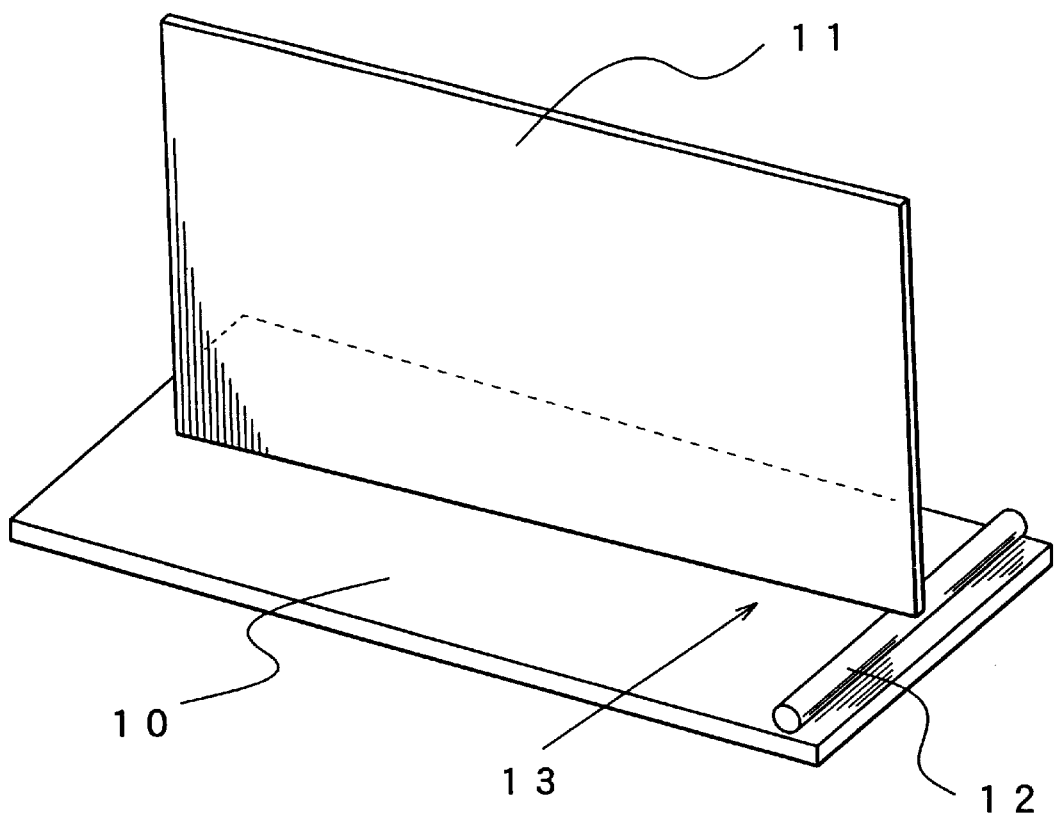
FIG. 4 is a perspective view of the parts being subject to the brazing test that have been assembled in accordance with a preferred embodiment of the present invention.

The above samples were used to join two metal parts having a reversed T configuration as shown in FIG. 4, by applying different quantities of coating in the gap between the parts, and the test was performed to check how the gap was filled. Specifically, one metal part 10, which serves as a companion metal made of JIS A3003 aluminum alloy and having the dimensions of 30 mm high, 60 mm wide, 1.5 mm thick, was disposed horizontally. Other metal part 11 serves as a base metal also made of JIS A3003 alloy and having the dimensions of 30 mm high, 50 mm wide, 1.0 mm thick. Then, coating of the inventive samples were applied onto both sides of the base metal 11 by using the flow coat process. Following this, the base metal part 11 was placed onto the companion metal part 10 like a reversed T configuration, with a spacer 12 the form of a bar of 2.0 mm diameter disposed across the metal part 10 on one side thereof. This spacer 12 provides a small gap 13 between the companion and base metal parts 10, 11.

Figure 5:
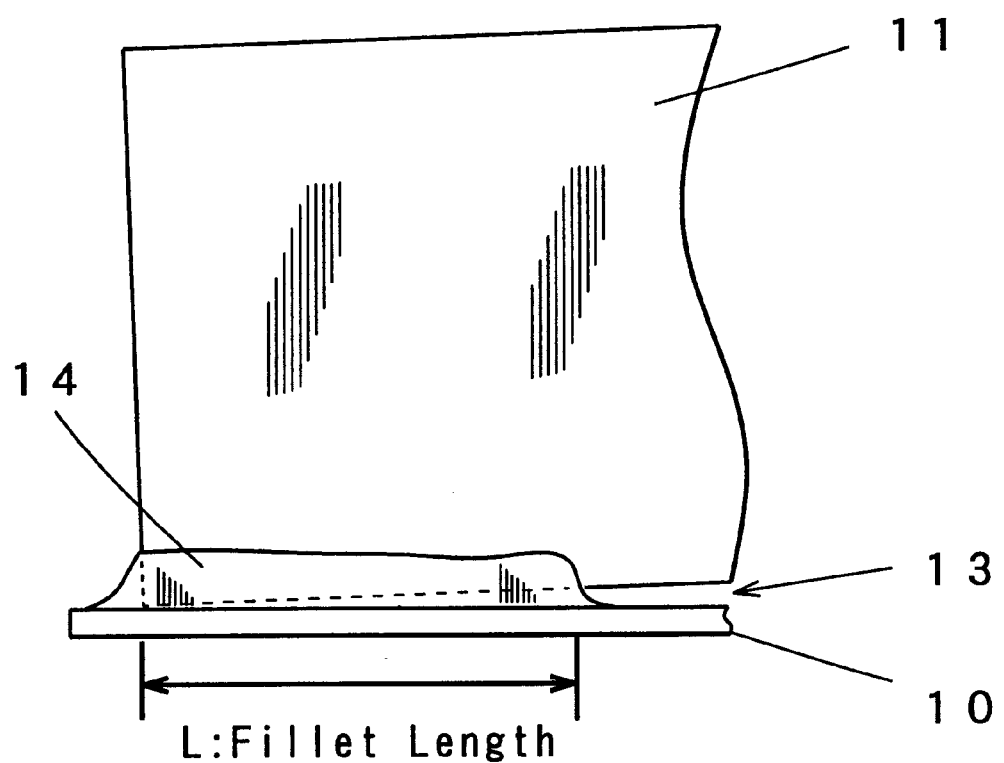
FIG. 5 is a similar view of FIG. 4, and shows, on an enlarged scale, the joint as brazed of the parts.
Figure 6:
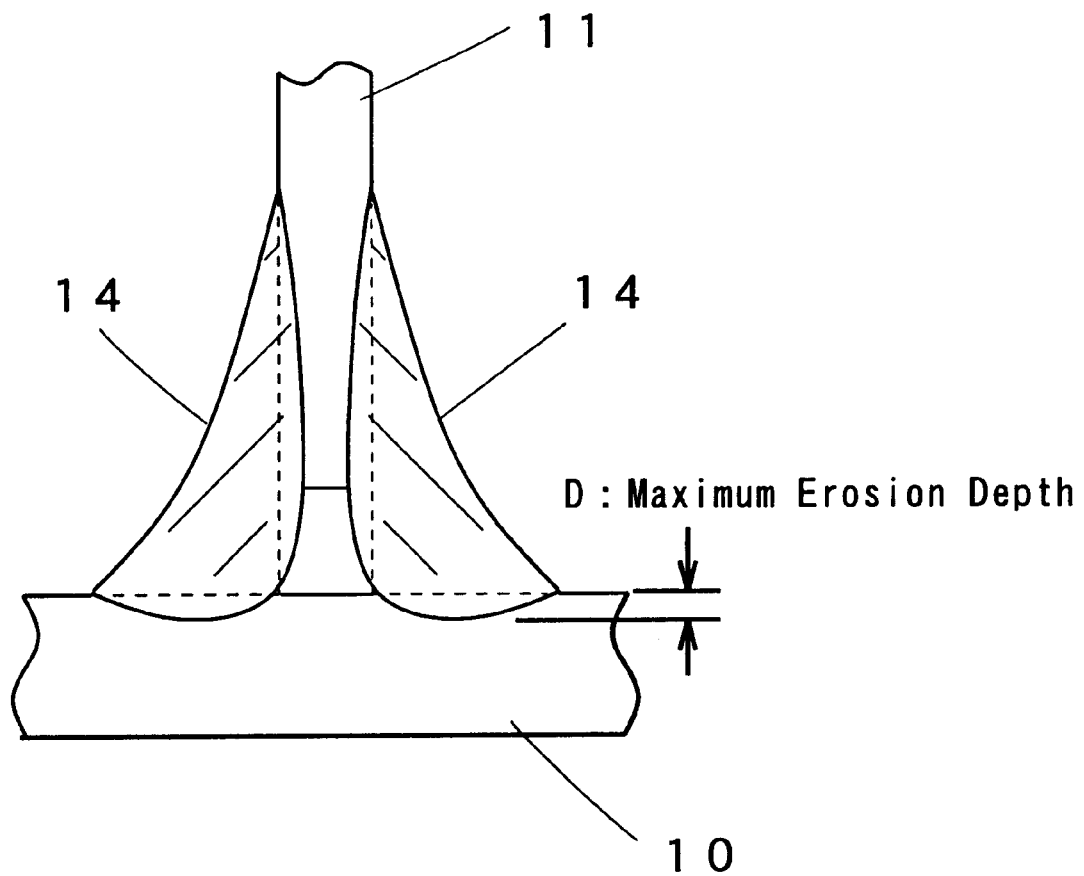
FIG. 6 is a similar view of FIG. 4, but is an enlarged cross-section of joint as brazed of the parts.

The companion metal part 10, the base metal part 11 and the spacer 12 were heated at 600° C. for 5 minutes, and were brazed under the inert gas atmosphere. During the brazing process, the applied coating as well as part of the base and companion metals were allowed to melt until the small gap 13 was filled along the length(L) of 30 mm. A brazed joint 14 was thus obtained. Finally, the amount of brazing powder that was actually applied for brazing was examined. As shown in FIGS. 5 and 6, the maximum erosion depth(D) in the brazed areas was also examined. The results are presented in Table 1.

The assembly thus completed was then subjected to CASS testing, wherein a testing acid salt (hot at 50° C.) including 0.26 g/l of cupric chloride was sprayed continuously (480 hours) against the assembly at a test room temperature of 50° C. Then, the brazing powder coated areas were checked for corrosion depth, and the type of corrosion was also examined. The fillet was also checked to examine the type of corrosion. The results are also presented in Table 1.

as more than 30%, they are shown that a general corrosion occurred and the erosion extended deeply into the base metal.

It may be understood from the above description that using the brazing powder that contains moderate amounts of Si and Zn may provide the good corrosion resistance both for the applied coating and for the formed fillet. Using less powder may also provide well-brazed joints.

EXAMPLE 2

In this embodiment, Al—Si—Zn ternary alloy powder was prepared, which includes molten Al alloy as atomized having the composition and average grain size as shown in Table 2. The Al—Si—Zn ternary alloy further includes a pure Si powder having the average grain size shown in Table

TABLE 1

| Samples No. | | Brazing Powder* Si Wt % | Zn Wt % | Amount of Coating (g/m²) | No. of Coating | Effect of Applied Brazing Maximum Erosion Depth (μm) | Maximum Corrosion Depth (μm) | Type of Corrosion | State of Corroded Fillet |
|---|---|---|---|---|---|---|---|---|---|
| Inventive | 1 | 16 | 5 | 200 | 2 | 160 | 150 | general | ⊚ |
| Samples | 2 | 16 | 30 | 200 | 2 | 160 | 90 | " | Δ |
|  | 3 | 25 | 10 | 125 | 1 | 180 | 120 | " | ○ |
|  | 4 | 25 | 16 | 125 | 1 | 180 | 80 | " | ○ |
|  | 5 | 25 | 25 | 125 | 1 | 180 | 80 | " | ○ |
|  | 6 | 30 | 20 | 100 | 1 | 200 | 70 | " | ○ |
|  | 7 | 40 | 22 | 70 | 1 | 230 | 76 | " | ○ |
|  | 8 | 45 | 24 | 65 | 1 | 250 | 72 | " | ○ |
|  | 9 | 50 | 16 | 60 | 1 | 270 | 80 | " | ○ |
|  | 10 | 50 | 25 | 60 | 1 | 270 | 80 | " | ○ ⊚ |
|  | 11 | 60 | 5 | 55 | 1 | 300 | 150 | " | ⊚ |
|  | 12 | 60 | 30 | 55 | 1 | 300 | 90 | " | Δ |
| Non inventive | 1 | 10 | — | 350 | 3 | 100 | 350 | pitting | ⊚ |
| Samples | 2 | 10 | 20 | 350 | 3 | 100 | 70 | general | x |
|  | 3 | 20 | 3 | 150 | 1 | 180 | 300 | pitting | ⊚ |
|  | 4 | 20 | 40 | 150 | 1 | 180 | 250 | general | x |
|  | 5 | 65 | — | 50 | 1 | 400 | 400 | pitting | ⊚ |

*Remainder: inevitable impurities & Al
(1) Corrosion Test: CASS (Copper Accelerated Acetic Acid Salty Spray Test)
(2) State of Corroded Fillet
⊚: none
○: Slight
Δ: corroded but no fillet removed
x: much corroded and fillet removed As clearly seen from Table 1, for samples containing above 15% by weight of Si, fewer number of coating and less powder per coating may provide the well-brazed joint (the well-filled gap), and the amount of the melted base metal (maximum erosion depth) may be controlled to a moderate degree. Particularly, for another samples containing 20 to 30% by weight of Si, the maximum erosion depths are relatively shallow, and the well-brazed joints are provided.

As seen from Table 1, for the sample containing more than 60% by weight of Si, the maximum erosion depth is greater, meaning that the base metal was eroded much more deeply. For some other samples that may present the above good property but contain no or little Zn, the base metal is found to have pits produced by corrosion, meaning that the corrosion went more deeply.

For still another samples containing a moderate quantity of Zn, the corrosion depths are shown to be noticeably shallow. For another samples containing too much Zn, such 2. Several samples of the brazing powder according to the present invention were thus obtained. Each of those samples, identified as 1 to 10, includes a total amount of Si and Zn, respectively, whose specific values are presented in Table 2. Those samples are called "the inventive samples". To compare with those samples, non inventive samples 1 to 5 were also prepared. Those samples are called "the non inventive samples".

An additional non inventive sample, referred to as "the prior art sample", that contains Al—Si binary alloy powder, was provided. Then, to 10 parts by weight of each of the inventive samples 1 to 10, non inventive samples 1 to 5 and prior art sample were added one part of brazing flux and one part of binder, all by weight. They were mixed into a slurry solder form. It is noted that each of the non inventive samples 1 to 5 has the composition ratio of the elements, and any of whose specific values are not specified by the invention.

As in the preceding example 1, each of those samples was applied to an object under tests. Then, the brazing was performed under the same conditions. A SWAAT test accomplished as follows. A test solution including artificial sea water and acetic acid was sprayed against the object at 50° C. for 30 minutes. The spraying was stopped at the end of 30 minutes, and the object was left for 30 minutes under the wet ambient atmosphere. The same process was repeated for 20 days. When the testing ended, the corrosion depth and the type of corrosion were examined. The results are presented in Table 2.

contained layer containing an adequate quantity of Zn to be formed onto the applied coating of the brazing powder. The type of corrosion that thus occurs on the surface of an object having the applied coating may be the general corrosion that prevents the corrosion from progressing into the depth of the object. Thus, the good corrosion resistance may be provided. The amount of brazing powder being applied may be reduced considerably as compared with the prior art powder. Nevertheless, the brazeability that may be provided is

TABLE 2

| Samples No. | | Mixture Ratio of Al—Si—Zn Powder and Si Powder (Wt %) | | Q'ty of Elements in Mixture powder (Total Amt) | | Average Grain Size ($\mu$m) | | Amt of Coating (g/m$^2$) | Maximum Erosion Depth (mm) | Type of Corrosion | Depth of Corrosion ($\mu$m) |
|---|---|---|---|---|---|---|---|---|---|---|---|
| | | | | Si (wt %) | Zn (wt %) | Al—Si—Zn | Si | | | | |
| Inventive Mixture Powders | 1 | Al-13% Si-20% Zn Powder:Si Powder = | 40:1 | 15.1 | 20 | 50 | 30 | 200 | 0.15 | General | 95 |
| | 2 | Al-13% Si-20% Zn Powder:Si Powder = | 11:1 | 20 | 18 | 50 | 30 | 150 | 0.16 | General | 90 |
| | 3 | Al-13% Si-20% Zn Powder:Si Powder = | 6:1 | 25 | 17 | 70 | 40 | 120 | 0.18 | General | 90 |
| | 4 | Al-20% Si-15% Zn Powder:Si Powder = | 7:1 | 30 | 13 | 70 | 50 | 100 | 0.20 | General | 90 |
| | 5 | Al-20% Si-15% Zn Powder:Si Powder = | 4:1 | 35 | 12 | 30 | 20 | 80 | 0.21 | General | 90 |
| | 6 | Al-20% Si-15% Zn Powder:Si Powder = | 3:1 | 40 | 11 | 30 | 20 | 70 | 0.23 | General | 90 |
| | 7 | Al-20% Si-20% Zn Powder:Si Powder = | 7:1 | 30 | 18 | 40 | 20 | 100 | 0.20 | General | 90 |
| | 8 | Al-30% Si-20% Zn Powder:Si Powder = | 4:1 | 44 | 16 | 80 | 30 | 68 | 0.24 | General | 90 |
| | 9 | Al-30% Si-20% Zn Powder:Si Powder = | 3:1 | 48 | 15 | 80 | 30 | 65 | 0.25 | General | 90 |
| | 10 | Al-40% Si-30% Zn Powder:Si Powder = | 3:1 | 55 | 23 | 80 | 50 | 60 | 0.26 | General | 100 |
| Non inventive powders | 1 | Al-20% Si-15% Zn Powder:Si Powder = | 7:1 | 30 | 13 | 50 | *100 | 100 | 0.40 | General | 90 |
| | 2 | Al-50% Si-30% Zn Powder:Si Powder = | 3:1 | *63 | 23 | 80 | 50 | 50 | 0.40 | General | 100 |
| | 3 | Al-7.5% Si-20% Zn Powder:Si Powder = | 36:1 | *10 | 19 | 70 | 50 | 250 | 0.14 | General | 90 |
| | 4 | Al-20% Si-3% Zn Powder:Si Powder = | 7:1 | 40 | *2 | 30 | 20 | 70 | 0.23 | Pitting | 350 |
| | 5 | Al-20% Si-40% Zn Powder:Si Powder = | 7:1 | 30 | 35 | 70 | 50 | 100 | 0.20 | General | 350 |
| | 6 | Al-7.5% Si Powder (Prior art) | | *7.5 | — | 50 | — | 350 | 0.14 | Pitting | 350 |

*: Non-inventive

The results in Table 2 show that for the joint brazed by using each of the inventive samples 1 to 10, the amount of the applied coating and the erosion depth are remarkably smaller than for that brazed by using the prior art sample No. 6. It is also shown that according to each of the inventive samples 1 to 10, the joint presents the type of general corrosion, whereas according to the prior art sample, the amount of the applied coating is larger, and the joint thus brazed presents the type of corrosion that produces pits, meaning that the joint is more susceptible to corrosion. It is also shown that for each of the non inventive samples 1 to 5, any of the properties, such as the amount of applied coating, maximum erosion depth and corrosion resistance, is undesirably poor. The fillet formed by using each of the inventive samples presents the good corrosion resistance, as for the fillet in the preceding embodiment.

It may be appreciated from the foregoing description that the brazing aluminum alloy powder composition according to the present invention, which includes the hypereutectic alloy containing Zn, provides the advantage of allowing a Zn equivalent to or more than that for the prior art powder. Thus, the present invention is of industrial utility.

Although the present invention has been described with reference to some particular preferred embodiments thereof, it should be understood that various changes and modifications may be made without departing from the spirit and scope of the invention.

What is claimed is:

1. A brazing aluminum alloy powder composition comprising a powder or mixture of powders of Al, Si and Zn which form an Al—Si—Zn hypereutectic alloy composition, wherein the Si is present in an amount of more than 15 and up to 60% by weight, based on the weight of the powder composition, the Zn is present in an amount of 5 to 30% by weight, based on the weight of the powder composition and the balance is Al.

2. The brazing aluminum alloy powder composition of claim 1, comprising a powder is selected from the group consisting of Al—Si alloy, Al—Si—Zn alloy, Al—Zn alloy, Si, and Zn.

3. The brazing aluminum alloy powder composition of claim 1, wherein the powder comprises a mixture composed of Al—Si—Zn hypereutectic alloy powder and Si powder.

4. The brazing aluminum alloy powder composition of claim 3, wherein said Al—Si—Zn hypereutectic alloy powder has an average grain size in the range of 5 to 100 μm and said Si powder has an average grain size in the range of 1 to 50 μm, the grain size for said Al—Si—Zn ternary hypereutectic alloy powder being larger than that of said Si powder.

5. The brazing aluminum alloy powder composition of claim 1, further comprising a brazing flux in a powdery form.

6. The brazing aluminum alloy powder composition of claim 1, wherein the Zn is present in an amount of 15 to 30%.

* * * * *